Nov. 10, 1964     R. W. NEIBAUR     3,156,852
FIXED CAPACITOR
Original Filed April 16, 1957
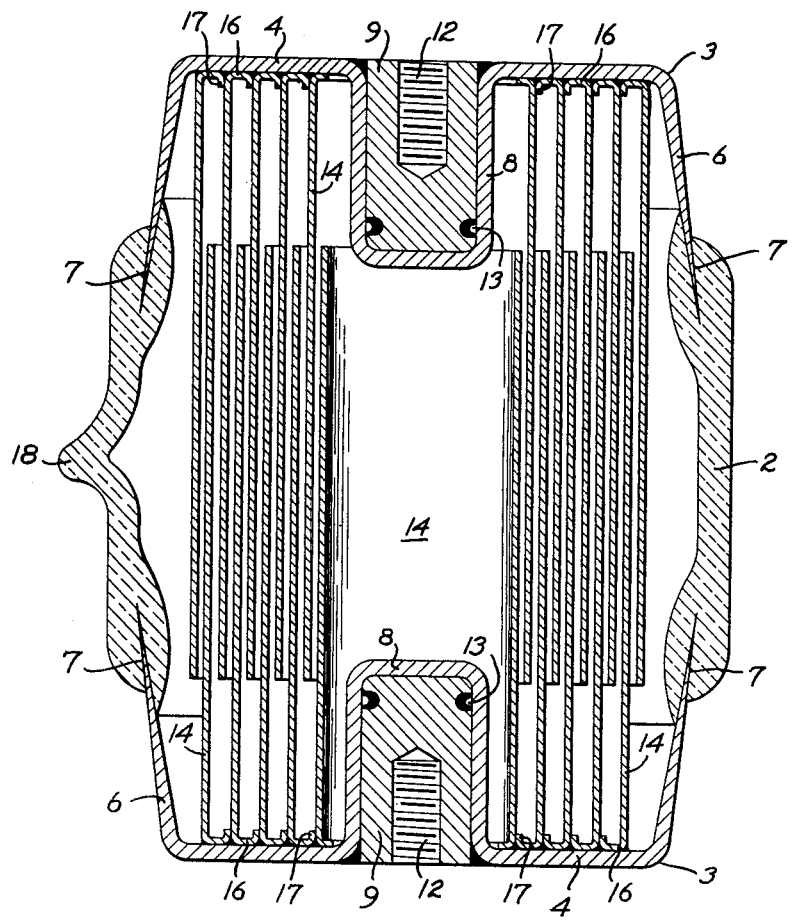
INVENTOR
RODERICK W. NEIBAUR

3,156,852
FIXED CAPACITOR

Roderick W. Neibaur, San Jose, Calif., assignor, by mesne assignments, to Jennings Radio Manufacturing Corporation, San Jose, Calif., a corporation of Delaware
Continuation of application Ser. No. 653,111, Apr. 16, 1957. This application June 17, 1964, Ser. No. 375,851
4 Claims. (Cl. 317—244)

My invention relates to fixed capacitors, and particularly to vacuum type fixed capacitors. This application is a continuation of my copending application Serial No. 653,111, filed April 16, 1957.

One of the objects of my invention is the provision of a vacuum type fixed capacitor of exceptionally small size.

Another object is the provision of a vacuum type fixed capacitor having relatively high voltage and current ratings in relation to its size.

Still another object is the provision of a small size vacuum fixed capacitor possessing qualities of mechanical rigidity and electrical stability found ordinarily only in much larger implements.

Still another object is a small vacuum fixed capacitor having an assembly of parts particularly adapting it for low cost manufacture.

Other objects will be brought out in the following description of the invention. I do not limit myself to the showing made by said description and the drawings, since I may use variant forms of the invention within the scope of the appended claims.

Referring to the drawing:

The figure is a vertical half sectional view, enlarged approximately four times actual size.

Broadly considered, the vacuum fixed capacitor of my invention comprises an evacuated envelope formed by two aligned metallic end caps spaced apart and hermetically closing opposite ends of a hollow dielectric shell interposed between the caps. Within the envelope a plurality of cylindrical condenser plates are rigidly mounted on each end cap to extend into the envelope in spaced interleaved relation. An inwardly extending boss constituting an outwardly opening thimble integrally formed in each end cap is filled with an integrally united hollow terminal plug, useful to connect the capacitor into a circuit.

In more specific terms, my fixed capacitor comprises an evacuated envelope symmetrical about a longitudinal axis and formed by a hollow cylindrical dielectric shell 2, closed at each opposite end by an inwardly opening copper end cap 3. Each of the end caps is cup-shaped to provide a circular end plate 4, having a slightly flaring integral flange 6 extending from its outer periphery. The free end of the flange is bonded hermetically to the associated end of the dielectric shell by the conventional metal-to-glass seal 7. While glass has been shown in the present embodiment, it is contemplated that other dielectric material, such as ceramic, may be bonded to the metal end caps to form the dielectric shell.

To provide convenient terminal means for connecting the capacitor into a circuit, each of the end caps is provided with a concentric, integral, inwardly extending, outwardly opening thimble 8, in which the terminal plug 9 is integrally brazed. The plug is hollow and preferably provided with internal threads 12 by which a terminal lead (not shown) may be releasably secured to the end cap.

To facilitate brazing the plug within the thimble, the plug is provided with an annular groove 13 adjacent its inner end, within which the brazing material may be placed prior to heating, and from which it will spread between the adjacent surfaces of plug and thimble to integrally unite the parts.

The inwardly extending thimble and the peripheral flange 6 of each end cap thus define, with the plate 4 from which each is formed, an inwardly opening annular channel within which are integrally brazed a plurality of concentric cylindrical condenser plates 14.

The condenser plates fixed in each cap form a set or group which is arranged in spaced interleaved relationship with the plates fixed in the cap opposite. The two groups are identical except in diameter of the individual plates, which vary by a fixed increment from the smallest or innermost plate to the largest or outermost. The assembled plates of the sets form annular groups of slightly different overall diameters, but the same length and the same radial thickness in both sets. Each of the condenser plates at its fixed end is provided with a radially extending flange 16 integrally united as by brazing to the plate 4, and each plate, except the inner or smallest of each set, is also provided with an integral reentrant cylindrical flange 17, closely fitting and integrally united with the next adjacent smaller plate.

A rigid, integral structure is thus formed, possessing the requisite strength to withstand rough handling and electrically imposed vibrations. The coalesced character of the union between condenser plates and end caps also provides a minimum, direct and continuous path for the conduction of heat outwardly to the radiating surfaces of end caps and dielectric shell. Evacuation of the capacitor envelope is accomplished through the tubulation 18 in the dielectric shell.

As shown in the drawing, the condenser plates are closely spaced and extend into the envelope to a point within the annular channel of the opposite end cap. The plates are thus interleaved for a major portion of their length to provide a voltage rating of approximately 7.5 kilovolts peak, and a current rating of 30 amperes R.M.S., in a capacitor approximately 1⁷⁄₁₆″ long and 1⅜″ in diameter. Because of the readily secured great accuracy of shape and assembly permitted by the interfitting flange and mounting construction of the condenser plate ends, and because of the substantial duplication of the end cap assemblies, material savings in costs of manufacture are possible without any sacrifice of high capacitance and high quality, each of which usually make heavy demands on production costs.

I claim:

1. A vacuum fixed capacitor comprising an evacuated envelope including aligned metallic end caps spaced apart and hermetically closing opposite ends of a dielectric shell interposed therebetween, each said end cap including a centrally disposed inwardly extending integral boss, and a plurality of mutually reaching integrally united concentric cylindrical condenser plates fixed in each end cap and interleaved with the condenser plates fixed in the opposite end cap.

2. The combination according to claim 1, in which said envelope is symmetrical about a longitudinal axis and the integral boss is hollow and constitutes an outwardly opening thimble.

3. In a vacuum fixed capacitor, the combination comprising a pair of metallic end caps spaced apart, each end cap having a concentric inwardly extending boss and a flaring peripheral flange defining with said concentric boss an annular channel, and a plurality of integrally united concentric cylindrical condenser plates fixed to each end cap within the channel and terminating in a plane perpendicular to the axis of the capacitor and adjacent to the inner end of the boss on the other end cap.

4. A vacuum fixed capacitor comprising an evacuated envelope symmetrical about a longitudinal axis and including aligned metallic end caps spaced apart and hermetically closing opposite ends of a dielectric shell interposed therebetween, each said end cap including a peripheral flange and a concentric inwardly extending outwardly opening integral thimble and with said peripheral flange defining an annular channel, and a plurality of mutually reaching integrally united concentric cylindrical condenser plates fixed to the end cap within each channel and interleaved with the condenser plates fixed in the opposite channel, each condenser plate having a length such that each plate terminates in a free end lying within the channel of the opposite end cap.

References Cited by the Examiner

UNITED STATES PATENTS

| | | | |
|---|---|---|---|
| 2,107,132 | 2/38 | Smith | 317—260 |
| 2,339,663 | 1/44 | Teare | 317—244 X |
| 2,485,913 | 10/49 | Osterman | 317—260 |
| 2,735,969 | 2/56 | Jennings | 317—244 |
| 2,790,094 | 4/57 | Smith et al. | 317—256 X |
| 2,920,255 | 1/60 | Luft | 317—245 |

FOREIGN PATENTS

| | | |
|---|---|---|
| 638,857 | 6/50 | Great Britain. |
| 851,088 | 9/39 | France. |

JOHN F. BURNS, *Primary Examiner.*